US011884050B2

(12) United States Patent
Mo et al.

(10) Patent No.: US 11,884,050 B2
(45) Date of Patent: Jan. 30, 2024

(54) CURVED-SURFACE LAMINATING DEVICE AND CURVED-SURFACE LAMINATING METHOD

(71) Applicants: Chengdu BOE Optoelectronics Technology Co., Ltd., Sichuan (CN); BOE Technology Group Co., Ltd., Beijing (CN)

(72) Inventors: Wenwei Mo, Beijing (CN); Wei Qing, Beijing (CN); Pengsha Ma, Beijing (CN); Shaokui Liu, Beijing (CN); Tinghui Chen, Beijing (CN)

(73) Assignees: Chengdu BOE Optoelectronics Technology Co., Ltd., Sichuan (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 17/636,718

(22) PCT Filed: Apr. 9, 2021

(86) PCT No.: PCT/CN2021/086121
§ 371 (c)(1),
(2) Date: Feb. 18, 2022

(87) PCT Pub. No.: WO2021/238434
PCT Pub. Date: Dec. 2, 2021

(65) Prior Publication Data
US 2022/0288911 A1     Sep. 15, 2022

(30) Foreign Application Priority Data

May 28, 2020   (CN) .......................... 202010467136.9

(51) Int. Cl.
*B32B 37/10*     (2006.01)
*B32B 17/06*     (2006.01)
(Continued)

(52) U.S. Cl.
CPC .......... *B32B 37/1018* (2013.01); *B32B 17/06* (2013.01); *B32B 37/0046* (2013.01);
(Continued)

(58) Field of Classification Search
CPC ... B32B 17/06; B32B 2457/20; B32B 37/003; B32B 37/0046; B32B 37/1018; B32B 38/10; B32B 38/1866; B32B 38/1875
See application file for complete search history.

(56) References Cited

U.S. PATENT DOCUMENTS

2010/0103138 A1   4/2010   Huang et al.
2016/0202728 A1   7/2016   Kim

FOREIGN PATENT DOCUMENTS

CN     109435410 A    3/2019
CN     109435411 A    3/2019
(Continued)

OTHER PUBLICATIONS

CN202010467136.9 first office action.
CN202010467136.9 second office action.

*Primary Examiner* — Sonya M Sengupta
(74) *Attorney, Agent, or Firm* — IPro, PLLC (57) ABSTRACT

The present disclosure provides a curved-surface laminating device and a curved-surface laminating method, for realizing lamination of a curved-surface cover plate and a flexible panel. The curved-surface laminating device comprises: a flexible profiling jig comprising a laminating surface with a shape matched with the curved-surface cover plate; a bearing film arranged between the laminating surface and the flexible panel and extending to two sides of the laminating surface, the bearing film being configured to be attached to the flexible panel; and a tensioning device in contact with the bearing film extending to the two sides of the laminating
(Continued)

surface and configured to tension the bearing film, so that the bearing film and the laminating surface are profiled.

16 Claims, 4 Drawing Sheets

(51) Int. Cl.
  *B32B 37/00* (2006.01)
  *B32B 38/10* (2006.01)
  *B32B 38/00* (2006.01)
(52) U.S. Cl.
  CPC .......... *B32B 38/10* (2013.01); *B32B 38/1875* (2013.01); *B32B 2457/20* (2013.01)

(56) References Cited

FOREIGN PATENT DOCUMENTS

| | | |
|---|---|---|
| CN | 109624296 A | 4/2019 |
| CN | 109648979 A | 4/2019 |
| CN | 208813578 U | 5/2019 |
| CN | 111546749 A | 8/2020 |

CURVED-SURFACE LAMINATING DEVICE AND CURVED-SURFACE LAMINATING METHOD

CROSS REFERENCE TO RELATED APPLICATIONS

The present application is a National Stage of International Application No. PCT/CN2021/086121, filed Apr. 9, 2021, which claims priority to Chinese Patent Application No. 202010467136.9, entitled "Curved-surface Laminating Device and Curved-surface Laminating Method", and filed to the China National Intellectual Property Administration on May 28, 2020, the entire contents of which are incorporated herein by reference.

FIELD

The present disclosure relates to the technical field of curved-surface display, in particular to a curved-surface laminating device and a curved-surface laminating method.

BACKGROUND

At present, OLED flexible display panels as display components of electronic equipment have been widely used in various electronic products. And, with the development of curved-surface screens, a length of an arc area of an glass cover plate outside a flexible OLED has become longer and longer, thereby putting forward higher requirements for a full laminating method of the glass cover plate and the flexible OLED. An existing vacuum laminating technology can only meet lamination of a glass cover plate with a small radian)(30°~40° and the display panel, and there is no corresponding solution for the laminating mode of a glass cover plate with a large radian and the display panel.

SUMMARY

Embodiments of the present disclosure provide a curved-surface laminating device, configured to realize lamination of a curved-surface cover plate and a flexible panel, and including:
  a flexible profiling jig, including a laminating surface with a shape matched with the curved-surface cover plate;
  a bearing film, arranged between the laminating surface and the flexible panel, and extending to two sides of the laminating surface, which the bearing film is configured to be attached to the flexible panel; and
  a tensioning device in contact with the bearing film extending to the two sides of the laminating surface, which the tensioning device is configured to tension the bearing film, so that the bearing film and the laminating surface are profiled.

In some embodiments, a radian of a bent part in the laminating surface ranges from 90° to 180°.

In some embodiments, in a direction perpendicular to a plane of the flexible profiling jig, a thickness of the flexible profiling jig is greater than 50 mm.

In some embodiments, the flexible profiling jig further includes an inner concave surface connected with an end surface of the laminating surface.

In some embodiments, a radian of the inner concave surface ranges from 80° to 160°.

In some embodiments, in a vertical direction of a thickness of the flexible profiling jig, the tensioning device is disposed coplanar with a middle portion of the inner concave surface.

In some embodiments, in a vertical direction of a thickness of the flexible profiling jig, a distance between the inner concave surface and the bearing film squeezed by the tensioning device is less than 0.5 mm.

In some embodiments, the tensioning device is a pressing and attaching roller.

In some embodiments, the curved-surface laminating device further includes: a first servo motor, configured to drive the tensioning device to move in the vertical direction of the thickness of the flexible profiling jig.

In some embodiments, the curved-surface laminating device further includes: a second servo motor, configured to drive the bearing film to move in a direction opposite to a movement direction of the tensioning device.

In some embodiments, the curved-surface laminating device further includes: an upper jig, configured to fix the curved-surface cover plate.

In some embodiments, the curved-surface cover plate includes a main body part and two bent parts located at two ends of the main body part;
  the upper jig includes a first part and two second parts located at two ends of the first part; the first part is matched with the main body part of the curved-surface cover plate in shape, and the two second parts are respectively matched with the two bent parts of the curved-surface cover plate in shape; and the first part is detachably connected with the two second parts respectively.

In some embodiments, the curved-surface laminating device further includes: a lower jig, configured to fix the flexible profiling jig.

Embodiments of the present disclosure further provide a curved-surface laminating method for laminating by adopting the laminating device described according to any one of the above, including:
  driving the tensioning device to squeeze the bearing film to bent towards the flexible profiling jig, so as to drive the flexible panel to bent along with the bearing film to realize profiling of the flexible panel and a laminating surface of the flexible profiling jig;
  driving the flexible profiling jig to move towards the curved-surface cover plate, so as to drive the bearing film and the flexible panel to enter an opening of the curved-surface cover plate, so that a non-bent area of the flexible panel and a non-bent area of the curved-surface cover plate are laminated;
  continuously driving the flexible profiling jig to move towards the curved-surface cover plate, so as to drive two ends of the bearing film and two ends of the flexible panel to be bent and deform, so that a bent area of the flexible panel and a bent area of the curved-surface cover plate are laminated;
  driving the flexible profiling jig to move away from the curved-surface cover plate; and
  peeling off the bearing film from the flexible panel.

DETAILED DESCRIPTION OF THE EMBODIMENTS

In order to make the objectives, technical solutions, and advantages of embodiments of the present disclosure clearer, the technical solutions of embodiments of the present disclosure will be described clearly and completely with reference to the accompanying drawings of embodiments of the present disclosure. The thickness and shape of each film layer in the drawings do not reflect the true scale, and the purpose is only to illustrate the content of the present disclosure. Apparently, the described embodiments are some, but not all, embodiments of the present disclosure. Based on the described embodiments of the present disclosure, all other embodiments attainable by those ordinarily skilled in the art without involving any inventive effort are within the protection scope of the present disclosure.

Unless defined otherwise, technical or scientific terms used herein shall have the ordinary meaning as understood by those ordinarily skilled in the art to which the present disclosure belongs. The "first", "second" and similar words used in the specification and claims of the present disclosure do not indicate any order, quantity or importance, but are merely used to distinguish different components. The word "include" or "comprise", and other similar words mean that a component or an article that precedes the word is inclusive of the component or article listed after the word and equivalents thereof, but does not exclude other components or articles. The terms "inner", "outer", "upper", "lower", and the like are used merely to denote a relative positional relationship that may change accordingly when the absolute position of an object being described changes.

At present, after an OLED flexible panel is prepared, a protective cover plate needs to be attached to the outside of a display screen to protect the OLED flexible panel. In order to realize the 3D curved-surface display of the OLED flexible panel, the edge end surface of the OLED flexible panel is usually set as an arc-shaped surface, so that an image in an edge area can also be displayed normally during display. Therefore, the edge end surface of the protective cover plate is also usually set as an arc-shaped surface so as to form a curved-surface cover plate that is matched with the flexible panel with the arc-shaped surface. In the present disclosure, "match" means that shapes are approximately the same.

Figure 1:
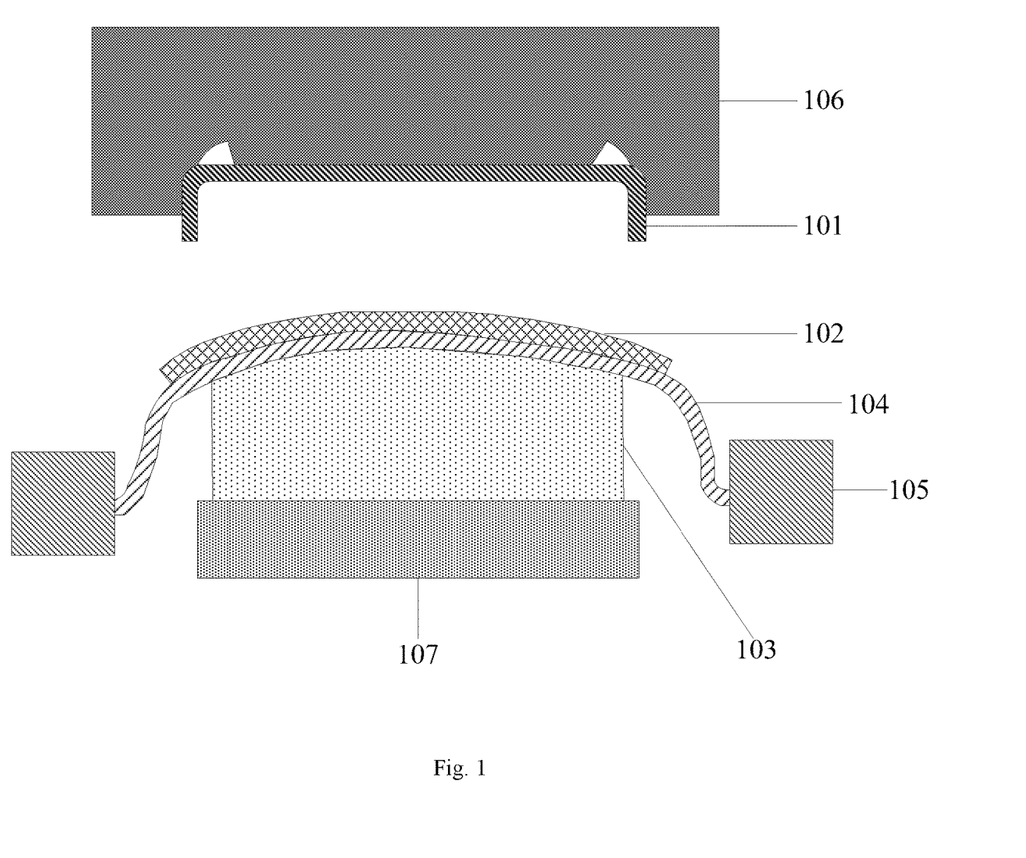
FIG. 1 is a schematic structural diagram of a curved-surface laminating device, provided by an embodiment of the related art.

In the related art, lamination of a curved-surface cover plate 101 and a flexible panel 102 is usually achieved by a curved-surface laminating device shown in FIG. 1. In some embodiments, in FIG. 1, a laminating surface of a flexible profiling jig 103 is configured to bear a bearing film 104, and the bearing film 104 is configured to be attached to the flexible panel 102. During lamination, the flexible profiling jig 103 moves upwards close to the curved-surface cover plate 101, air cylinders 105 clamp the bearing film 104 to achieve profiling of the flexible panel 102, that is, a shape of the flexible panel 102 and a shape of the laminating surface are similar, and the shape of the laminating surface is the same as a shape of the curved-surface cover plate 101 so that the flexible panel 102 and the curved-surface cover plate 101 can be laminated in an order of contact from a flat area in the middle to bent areas on both sides.

It can be seen from FIG. 1 that in the process of moving upwards and laminating the flexible profiling jig 103, insufficient fixing tension of the air cylinders 105 easily leads to insufficient profiling of the flexible panel 102 before vacuum lamination, so the flexible panel 102 is in contact with the edge of the curved-surface cover plate 101 in advance, the flexible panel 102 is too tight or too loose in the lamination process, air bubbles are easily generated between the flexible panel 102 and the curved-surface cover plate 101 when the flexible panel 102 is too loose, the flexible panel 102 is easily cracked and damaged when the flexible panel 102 is too tight, and the lamination quality of the flexible panel and the curved-surface cover plate 101 is seriously affected.

In addition, in the process of laminating the curved-surface cover plate 101 with a large radian and the flexible panel 102, since the flexible panel 102 cannot be well profiled, it is inevitable that an optical clear adhesive (OCA) is in contact with the edge of the curved-surface cover plate 101 in advance during lamination of the bent areas, and the OCA and the curved-surface cover plate 101 cannot be effectively separated and laminated again once contacted, resulting in incomplete lamination of the bent areas and defects such as bubbles/wrinkles.

Figure 2:
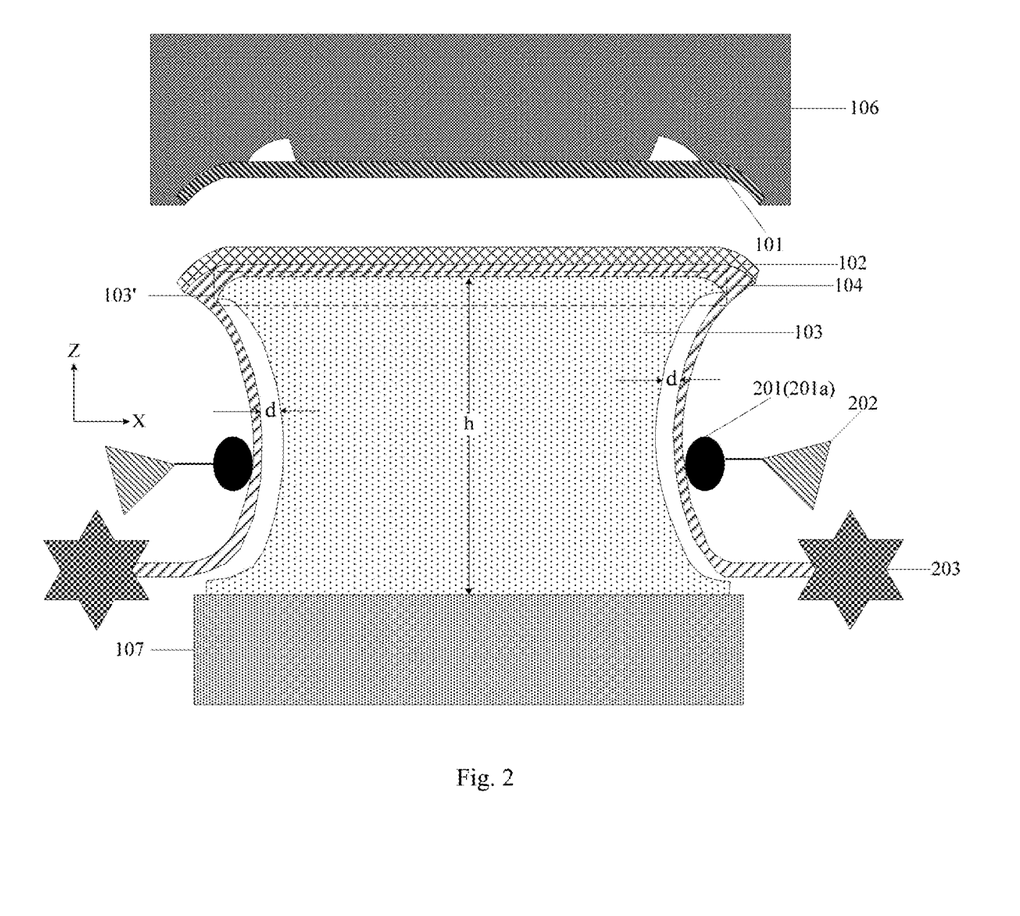
FIG. 2 is a schematic structural diagram of a curved-surface laminating device, provided by an embodiment of the present disclosure.

In response to the above problems in the related art, embodiments of the present disclosure provide a curved-surface laminating device. As shown in FIG. 2, the curved-surface laminating device includes a flexible profiling jig 103, where the flexible profiling jig 103 includes a laminating surface 103', and the laminating surface 103' provides with a shape matched with a curved-surface cover plate 101, that is, an upper surface of the laminating surface 103' and a lower surface of the curved-surface cover plate 101 are approximately the same in shape and size;

a bearing film 104, arranged between the laminating surface 103' and a flexible panel 102, extending to two sides of the laminating surface 103', and configured to be attached to the flexible panel 102; and tensioning devices 201 in contact with the bearing film 104 extending to the two sides of the laminating surface 103' and configured to tension the bearing film 104, so that the bearing film 104 drives the flexible panel 102 to be profiled with the laminating surface 103'.

In some embodiments, the tensioning devices 201 are added on both sides of the laminating surface 103' of the flexible profiling jig 103, so that the bearing film 104 is squeezed by the tensioning devices 201 in an X direction in the lamination process so as to be bent and deform towards the flexible profiling jig 103 to drive the flexible panel 102 on the bearing film 104 to achieve good or even complete profiling with the laminating surface 103' of the flexible profiling jig 103. That is, the profiling of the flexible panel 102 and the laminating surface 103' of the flexible profiling jig 103 is well completed before lamination, thereby avoiding defects such as bubbles and cracks caused by the pre-contact between the side of the flexible panel 102 and the curved-surface cover plate 101, and improving the lamination yield.

In some embodiments, the tensioning devices 201 are driven by driving components (for example, first servo motors 202) to move in a vertical direction (ie, the X direction) of a thickness of the flexible profiling jig 103. The curved-surface cover plate 101 may be a glass cover plate, and an upper jig 106 fixes the curved-surface cover plate 101 in a combination of vacuum suction and short side clamping. A lower jig 107 is provided with a profiling groove matched with the lower end surface of the flexible contour jig 103 to fix the flexible contour jig 103 through the profiling groove. The curved-surface cover plate 101 and the flexible panel 102 are adhesively laminated by optical clear adhesive (OCA). Generally, the optical clear adhesive may be coated on the flexible panel 102 before the flexible panel 102 enters an accommodating space of the upper jig 106, and then when the flexible panel 102 is in contact with the curved-surface cover plate 101 under the combined action of the thrust of the lower jig 107 and the pressure of the upper jig 106, the two may be laminated together. Specifically, the lower jig 107 may be powered by a hydraulic column to realize up and down transverse movement.

In some embodiments, after completing the profiling of the flexible panel 102 and the laminating surface 103' of the flexible profiling jig 103, the lower jig 107 may be driven to drive the flexible panel 102 to move upwards to the position 1 mm away from the inner side area of the curved-surface cover plate 101, and then a moving speed of the lower jig 107 is reduced, so that a flat area on the inner side of the curved-surface cover plate 101 and the optical clear adhesive are in contact with each other in an order from the middle to the two ends to complete the laminating process of the flat area; and then the lower jig 107 is drive to continue to move upwards so as to increase the lamination pressure, the laminating surface 103' deforms to the left and right sides to be matched with bent areas of the curved-surface cover plate 101, the tensioning devices 201 squeeze the bearing film 104 so as to drive the flexible panel 102 to be profiled with the laminating surface 103' towards the left and right sides, and lamination of left and right bent parts is realized.

In some embodiments, the tensioning device 201 may be components such as a pressing and attaching roller 201a a spring, and a tensioner that may move back and forth in the X direction. In addition, the quantity of the tensioning device 201 is not limited in the present disclosure. In some embodiments, FIG. 2 only exemplarily shows two tensioning devices 201 on both sides of the flexible profiling jig 103. The flexible profiling jig 103 may be made of materials with high fatigue strength and high resilience characteristics such as rubber and silica gel.

Figure 3:
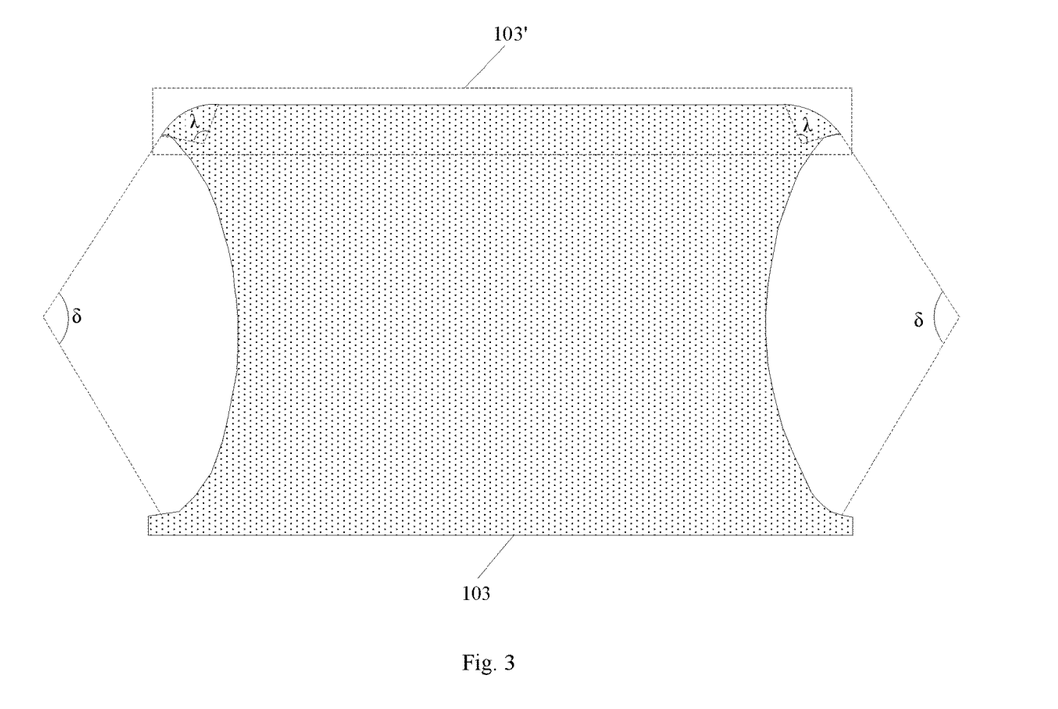
FIG. 3 is a schematic structural diagram of a flexible profiling jig, provided by an embodiment of the present disclosure.

In some embodiments, as shown in FIG. 3, a radian λ of the bent parts in the laminating surface 103' ranges from 90° to 180°. Since the laminating surface 103' has a shape matched with the curved-surface cover plate 101, a radian of bent parts of the curved-surface cover plate 101 also ranges from 90° to 180°, so as to realize lamination of the curved-surface cover plate 101 with the large radian and the flexible panel 102. In some embodiments, when the radian of the bent parts of the curved-surface cover plate 101 ranges from 90° to 180°, a size of the flexible panel 102 in the X direction may be slightly smaller than a length of an opening of the curved-surface cover plate 101, so that the flexible panel 102 may enter the accommodating space of the curved-surface cover plate 101, thereby preventing the optical clear adhesive from being in contact with the curved-surface cover plate 101 in advance, and facilitating the good matching and laminating of the flexible panel 102 and the curved-surface cover plate 101. In addition, in order to facilitate the clamping and fixing of the upper jig 106 to the large-angle (for example, an inverted type with a 180-degree bent shape at both ends) curved-surface cover plate 101, as shown in FIG. 4, the upper jig 106 may be designed to include a first part 1061 and two second parts 1062 located at both ends of the first part 1061, and the first part 1061 is detachably connected to the two second parts 1062 respectively.

Figure 4:
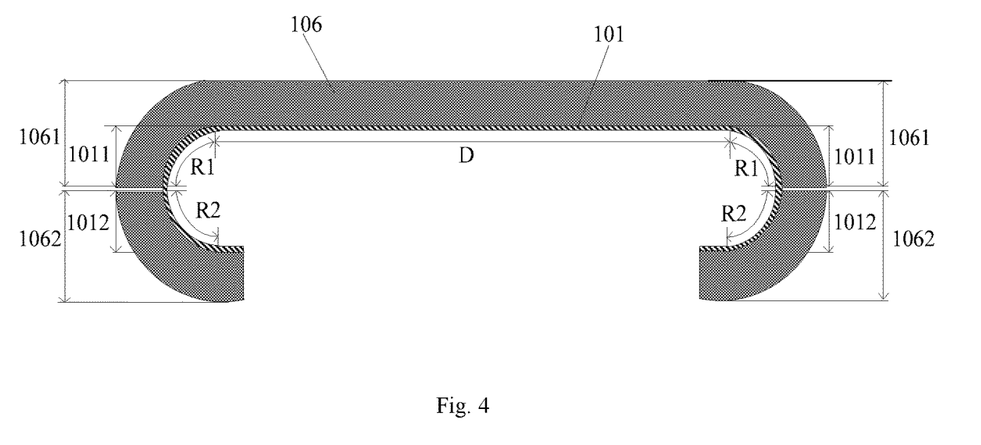
FIG. 4 is a schematic structural diagram of a 180° inverted type curved-surface cover plate, provided by an embodiment of the present disclosure.

In some embodiments, as shown in FIG. 4, a main body part 1011 of the curved-surface cover plate 101 may include a flat area D and two ¼ arc bent areas R1 located at both ends of the flat area D; auxiliary body parts 1012 of the curved-surface cover plate 101 include ¼ arc bent areas R2; and the ¼ arc bent areas R2 of the auxiliary body parts 1012 and the ¼ arc bent areas R1 of the main body part 1011 are connected so that the main body part 1011 and the auxiliary body parts 1012 are bent at 180 degrees. In other words, the curved-surface cover plate 101 is in a shape with both ends bent at 180 degrees, the bent parts are each in a shape of a semi-circular arc, and the main body part 1011 and the auxiliary body parts 1012 divide the semi-circular arc-shaped bent parts equally and each has a ¼ arc bent area. Correspondingly, arrangement of the first part 1061 and the two second parts 1062 of the upper jig 106 is identical to that of the main body part 1011 and the two auxiliary bodies 1012 of the curved-surface cover plate 101.

In some embodiments, the curved-surface cover plate 101 may be fixed in the accommodating space formed by the upper jig 106 in the following ways: firstly, the two second parts 1062 and the first part 1061 of the upper jig 106 are disassembled and separated; and then the main body part 1011 of the curved-surface cover plate 101 is in contact with the first part 1061 of the upper jig 106; and finally, the two second parts 1062 of the upper jig 106 respectively cover the two auxiliary body parts 1012 of the curved-surface cover plate 101, and the two second parts 1062 is fixedly installed on the first part 1061 respectively.

In some embodiments, as shown in FIG. 2, in a direction perpendicular to a plane of the flexible profiling jig 103, a thickness h of the flexible profiling jig 103 is greater than 50 mm. In the related art, the thickness h of the flexible profiling jig 103 is generally 16 mm. In the present disclosure, the thickness h of the flexible profiling jig 103 is increased to increase the deformation of the flexible profiling jig 103, which is beneficial to realizing lamination and profiling of the tensioning devices 201 on the bearing film 104.

In some embodiments, as shown in FIG. 2, the flexible profiling jig 103 further includes inner concave surfaces in contact with an end surface of the laminating surface 103'. The design of the upper part expansion and the middle waist contraction may ensure that after the flexible profiling jig 103 is pressed, the laminating surface 103' squeezes to the left and right sides and drives the bent parts of the bearing film 104 and the flexible panel 102 to complete profiling and lamination with the bent parts of the curved-surface cover plate 101.

In some embodiments, as shown in FIG. 3, a radian δ of the inner concave surfaces ranges from 80° to 160°, for example, 80°, 90°, 100°, 110°, 120°, 130°, 140°, 150°, 160°, etc. In this way, the tensioning devices 201 may conveniently apply the squeezing stress to the bearing film 104 so that the bearing film 104 can better drive the flexible panel 102 to realize the profiling with the laminating surface 103'.

In some embodiments, as shown in FIG. 2, in the vertical direction (ie, the X direction) of the thickness h of the flexible profiling jig 103, the tensioning devices are disposed coplanar with middle portions of the inner concave surfaces. Since the flexible profiling jig 103 has the largest inner concave amplitude at the middle portions (that is, middle areas) of the inner concave surfaces, the tensioning devices 201 and the middle portions of the inner concave surfaces are disposed on the same plane to make the tensioning devices 201 have the largest stroke in an inner concave direction (ie, the X direction) so that the bearing film 104 can be squeezed better to drive the flexible panel 102 to complete the profiling with the laminating surface 103'. Of course, in specific implementation, the tensioning devices 201 may also be disposed near the middle portions of the inner concave surfaces in a Z direction, which is not specifically limited here.

In some embodiments, in the vertical direction (ie, the X direction) of the thickness h of the flexible profiling jig 103, a distance between the inner concave surfaces and the bearing film 104 squeezed by the tensioning devices 201 is less than 0.5 mm. In an ideal state, under the squeezing action of the tensioning devices 201, the bearing film 104 will be in contact with the inner concave surfaces on both sides of the flexible profiling jig 103 at zero distance to ensure that the bearing film 104 drives the flexible panel 102 to realize the perfect profiling effect with the laminating surface 103' of the flexible profiling jig 103. However, in the actual laminating and profiling process, it is generally necessary to stretch the bearing film 104 in the X direction through driving components (for example, second servo motors 203), and under the driving function of tension on the bearing film 104, both ends of the flexible panel 102 are bent to be matched with the two bent parts of the curved-surface cover plate 101. Exemplarily, the second servo motors 203 are configured to drive the bearing film 104 to advance in a direction opposite to a movement direction of the tensioning devices 201. Since a direction of the tension is opposite to a direction of squeezing stress of the tensioning devices 201, there will be a certain distance between the inner concave surfaces and the bearing film 104 squeezed by the tensioning devices 201 to a certain extent. Considering the synergy of the tensioning devices 201 and the second servo motors 203, in the present disclosure, under the condition that the distance between the bearing film 104 and the inner concave surfaces on both sides of the flexible profiling jig 103 under the squeezing action of the tensioning devices 201 is less than 0.5 mm, a good profiling effect can still be guaranteed.

Based on the same inventive concept, embodiments of the present disclosure provide a curved-surface laminating method for laminating by adopting the above curved-surface laminating device. Since the principle of the laminating method to solve the problem is similar to the principle of the above curved-surface laminating device to solve the problem, the implementation of the curved-surface laminating method provided in embodiments of the present disclosure may refer to the implementation of the curved-surface laminating device provided by embodiments of the present disclosure, and the repetition will not be described.

Figure 5:
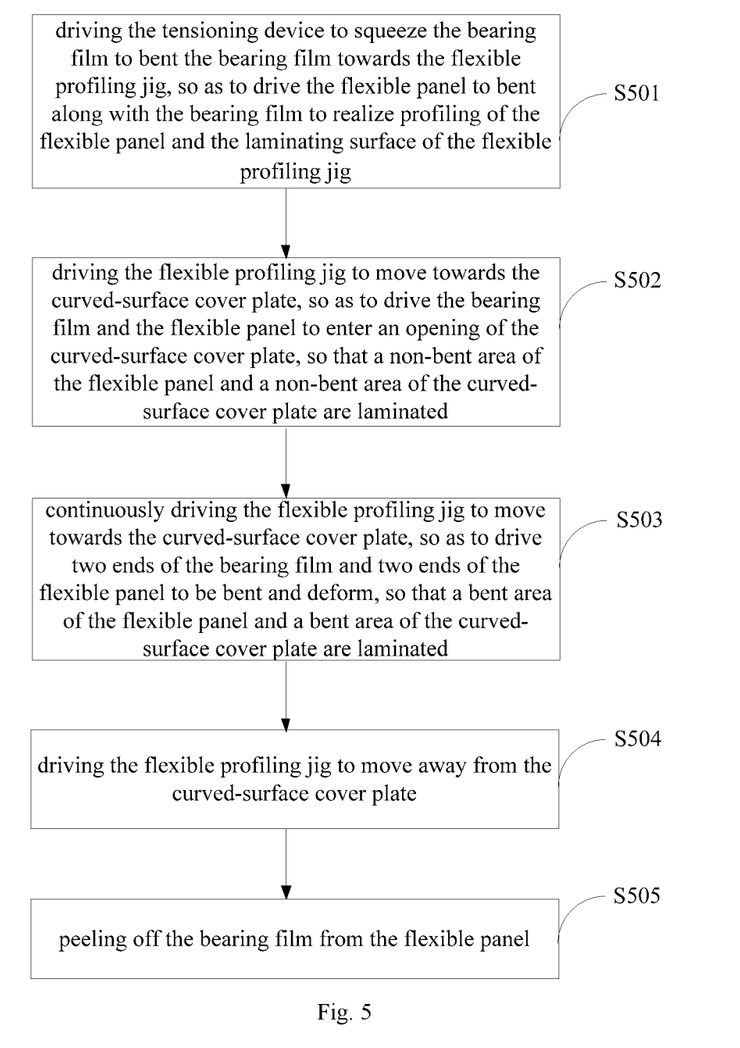
FIG. 5 is a flowchart of a curved-surface laminating method, provided by an embodiment of the present disclosure.

In some embodiments, the curved-surface laminating method provided by the embodiment of the present disclosure, as shown in FIG. 5, may specifically include the following steps:

S501, tensioning devices are driven to squeeze the bearing film to be bent towards a flexible profiling jig, so as to drive the flexible panel to be bent along with the bearing film to realize profiling of the flexible panel and the laminating surface of the flexible profiling jig;

S502, the flexible profiling jig is driven to move towards the curved-surface cover plate, so as to drive the bearing film and the flexible panel to enter an opening of the curved-surface cover plate, so that a non-bent area of the flexible panel and a non-bent area of the curved-surface cover plate are laminated;

S503, the flexible profiling jig is continuously driven to move towards the curved-surface cover plate, so as to drive two ends of the bearing film and two ends of the flexible panel to be bent and deform, so that a bent area of the flexible panel and a bent area of the curved-surface cover plate are laminated;

S504, the flexible profiling jig is driven to move away from the curved-surface cover plate; and S505, the bearing film and the flexible panel are peeled off.

It can be understood that after the completion of the lamination operation of the flexible panel 102 and the curved-surface cover plate 101, the flexible profiling jig needs to be driven away from an accommodating space of an upper jig 106, since the flexible profiling jig itself is likely to deform by force, and may be restored to its original state after the external force is removed, a lower jig 107 is controlled to move downwards through a hydraulic column, etc., the flexible profiling jig moves downwards along with the lower jig 107, and in the process of moving downwards, the flexible profiling jig will be separated from a bearing film 104 and leave the accommodating space from an opening of the accommodating space. After that, it is generally necessary to peel off the bearing film 104 from the flexible panel 102. Exemplarily, a side of the bearing film 104 in contact with the flexible panel 102 may be made of UV-viscosity adhesive, and viscosity may be greatly reduced by ultraviolet radiation so that the bearing film 104 can be easily peeled off from the flexible panel 102.

In some embodiments, the curved-surface laminating device includes: the flexible profiling jig, including the laminating surface having the shape matched with the curved-surface cover plate; the bearing film, located between the laminating surface and the flexible panel, extending to two sides of the laminating surface, and configured to be attached to the flexible panel; and the tensioning devices in contact with the bearing film extending to the two sides of the laminating surface and configured to tension the bearing film, so that the bearing film and the laminating surface are profiled. By adding the tensioning devices on both sides of the laminating surface of the flexible profiling jig, the bearing film is squeezed by the tensioning devices in an X direction and is bent and deforms towards the flexible profiling jig in the lamination process, and profiling of the flexible panel on the bearing film and the laminating surface of the flexible profiling jig will be completed along with the bearing film. That is, good profiling of the flexible panel and the laminating surface of the flexible profiling jig is completed before lamination, thereby avoiding defects such as bubbles and cracks caused by the pre-contact of the side of the flexible panel and the curved-surface cover plate, and improving the lamination yield.

It will be apparent to those skilled in the art that various modifications and variations can be made in embodiments of the present disclosure without departing from the spirit or scope of embodiments of the present disclosure. Thus, if these modifications and variations of embodiments of the present disclosure fall within the scope of the claims of the present disclosure and its equivalent technology, the present disclosure is also intended to include these modifications and variations.

What is claimed is:

1. A curved-surface laminating device, configured to realize lamination of a curved-surface cover plate and a flexible panel, and comprising:
   a flexible profiling jig, comprising a laminating surface with a shape matched with the curved-surface cover plate;
   a bearing film, arranged between the laminating surface and the flexible panel, and extending to two sides of the laminating surface, wherein the bearing film is configured to be attached to the flexible panel; and a tensioning device in contact with the bearing film extending to the two sides of the laminating surface, wherein the tensioning device is configured to tension the bearing film, so that the bearing film and the laminating surface are profiled;

wherein the flexible profiling jig further comprises an inner concave surface connected with an end surface of the laminating surface;

in a vertical direction of a thickness of the flexible profiling jig, the tensioning device is disposed coplanar with a middle portion of the inner concave surface.

2. The curved-surface laminating device according to claim 1, wherein a radian of a bent part in the laminating surface ranges from 90° to 180°.

3. The curved-surface laminating device according to claim 1, wherein in a direction perpendicular to a plane of the flexible profiling jig, a thickness of the flexible profiling jig is greater than 50 mm.

4. The curved-surface laminating device according to claim 1, wherein a radian of the inner concave surface ranges from 80° to 160°.

5. The curved-surface laminating device according to claim 1, wherein in a vertical direction of a thickness of the flexible profiling jig, a distance between the inner concave surface and the bearing film squeezed by the tensioning device is less than 0.5 mm.

6. The curved-surface laminating device according to claim 1, wherein the tensioning device is a pressing and attaching roller.

7. The curved-surface laminating device according to claim 6, further comprising: a first servo motor;

wherein the first servo motor is configured to drive the pressing and attaching roller to move in the vertical direction of the thickness of the flexible profiling jig.

8. The curved-surface laminating device according to claim 7, further comprising: a second servo motor;

wherein the second servo motor is configured to drive the bearing film to move in a direction opposite to a movement direction of the pressing and attaching roller.

9. The curved-surface laminating device according to claim 1, further comprising: an upper jig;

wherein the upper jig is configured to fix the curved-surface cover plate.

10. The curved-surface laminating device according to claim 9, wherein:

the curved-surface cover plate comprises:

a main body part; and two bent parts, respectively located at two ends of the main body part;

the upper jig comprises:

a first part, matched with a shape of the main body part of the curved-surface cover plate;

two second parts, respectively located at two ends of the first part, wherein the two second parts are respectively matched with shapes of the two bent parts of the curved-surface cover plate, and the first part is detachably connected with the two second parts respectively.

11. The curved-surface laminating device according to claim 1, further comprising: a lower jig;

wherein the lower jig is configured to fix the flexible profiling jig.

12. A curved-surface laminating method, adopting the laminating device according to claim 1 for laminating, comprising:

driving the tensioning device to squeeze the bearing film to bent the bearing film towards the flexible profiling jig, so as to drive the flexible panel to bent along with the bearing film to realize profiling of the flexible panel and the laminating surface of the flexible profiling jig;

driving the flexible profiling jig to move towards the curved-surface cover plate, so as to drive the bearing film and the flexible panel to enter an opening of the curved-surface cover plate, so that a non-bent area of the flexible panel and a non-bent area of the curved-surface cover plate are laminated;

continuously driving the flexible profiling jig to move towards the curved-surface cover plate, so as to drive two ends of the bearing film and two ends of the flexible panel to be bent and deform, so that a bent area of the flexible panel and a bent area of the curved-surface cover plate are laminated;

driving the flexible profiling jig to move away from the curved-surface cover plate; and peeling off the bearing film from the flexible panel.

13. The curved-surface laminating method according to claim 12, wherein a radian of a bent part in the laminating surface ranges from 90° to 180°.

14. The curved-surface laminating method according to claim 12, wherein in a direction perpendicular to a plane of the flexible profiling jig, a thickness of the flexible profiling jig is greater than 50 mm.

15. The curved-surface laminating method according to claim 12, wherein a radian of the inner concave surface ranges from 80° to 160°.

16. The curved-surface laminating method according to claim 12, wherein in a vertical direction of a thickness of the flexible profiling jig, a distance between the inner concave surface and the bearing film squeezed by the tensioning device is less than 0.5 mm.

* * * * *